UNITED STATES PATENT OFFICE 2,281,437

AGE RESISTANT RUBBER HYDROCHLORIDE

Albert Hershberger, Buffalo, N. Y., assignor to E. I. du Pont de Nemours & Company, Wilmington, Del., a corporation of Delaware No Drawing. Application March 2, 1940,
Serial No. 321,984

14 Claims. (Cl. 260—735)

This invention relates to rubber hydrohalides, especially rubber hydrochloride. More particularly it relates to thin sheets of rubber hydrochloride which do not readily deteriorate.

Rubber, having the formula:

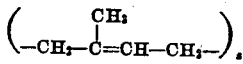

in which $z$ is a positive integer, readily adds hydrogen chloride to form a product called rubber hydrochloride, having the formula:

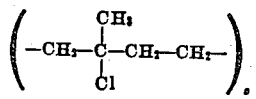

in which $z$ is a positive integer, as indicated in J. I. E. C. XXVI 125, Paper Trade Journal February 23, 1939, page 96, and the literature cited therein. The addition of the chlorine radicals can be readily regulated to produce products of various chlorine contents. Materials analyzing 26%–34% chlorine are distinctly different from rubber and are now available on a commercial scale.

Rubber hydrochlorides and the corresponding other rubber hydrohalides deteriorate rapidly upon aging, exposure to light, and subjection to elevated temperatures. This deterioration which may include photochemical disintegration, is perhaps the principal reason why the material has not gone into a wider use, particularly in the sheet wrapping material field.

This invention has for an object the preparation of rubber hydrohalide products, particularly rubber hydrochloride sheet wrapping materials which would not become brittle and/or fragile and/or dark-colored upon aging for long periods of time in the presence of air and/or upon subjection to elevated temperatures and/or upon exposure to light. The preparation of light, heat and age resistant rubber hydrochloride compositions suitable for sheets, continuous webs, filament solutions, coating compositions, molded articles and the like, constituted other objects. Another object was to prepare rubber hydrochloride articles stabilized with stearic acid salts of ammonia derivatives and the like. Still other objects were to provide a new class of materials for increasing the resistance of rubber hydrochloride to the action of both light and heat, and to provide light and heat resistance to rubber hydrochloride compositions suitable for use in the preparation of sheets, filament solutions, coating compositions, molded articles, and the like. A general advance in the art, and other objects which will appear hereinafter, are also contemplated.

It has now been found that resistant rubber hydrochloride compositions and/or articles can be produced by stabilizing rubber hydrochloride with long chain fatty acid salts of aliphatic radical substitution derivatives of ammonium hydroxide.

From the following description and specific examples, in which are disclosed certain embodiments of the invention as well as details of what is believed to be the best mode for carrying out the invention, it will be apparent how the foregoing objects and related ends are accomplished. The parts are given by weight throughout the application.

Example I

A batch of rubber hydrochloride was prepared by passing dry hydrogen chloride into a 5% solution of 15 minute milled pale crepe rubber in chloroform. The rubber hydrochloride was precipitated by methanol and after separation, was washed with methanol. It contained 30.5% chlorine. Some of the product was dissolved in chloroform to form a 6% solution, to which was then added 5% (based on the weight of the rubber hydrochloride) of benzyl-tri-methyl ammonium stearate. The stabilizer dissolved readily in the solution. Films were cast from the resulting clear solution on a chromium plated steel plate, and dried at about 40° C. The resulting films, after stripping from the plate, were approximately 0.001 of an inch thick. They were flexible, transparent and strong. Strips of the film heated at 65° C. in the dark retained good film properties during 47 days. Films cast from some of the rubber hydrochloride solution to which no stabilizer had been added became embrittled after 15 days.

Example II

To a 6% solution (in chloroform) of rubber hydrochloride there was added 10% (based on the weight of the rubber hydrochloride) of benzyl-tri-methyl-ammonium-stearate. Higher or lower concentrations of this stabilizer may be used. The resulting rubber hydrochloride composition was found to be suitable for the preparation of self-supporting films (and coatings) which were resistant to deterioration with age. Transparent, self-supporting films approximately 0.001 of an inch thick prepared from the above dope by solvent evaporation, retained in a large measure their flexibility, tensile strength and toughness for 85 days under ordinary normal room aging conditions in indirect sunlight. Corresponding films prepared from the unmodified rubber hydrochloride were quite brittle after 30 days' exposure under the same conditions.

*Example III*

To a 5% solution (in chloroform) of rubber hydrochloride, 10% (based on the weight of the rubber hydrochloride) of methyl-propyl-ammonium-oleate was added. The stabilizer dissolved readily in the solution. The resulting rubber hydrochloride composition was found to be suitable for the preparation of films and coatings which are resistant to deterioration with age.

Transparent, self-supporting films approximately 0.001 of an inch thick, prepared from the above composition by solvent evaporation, retained in a large measure their flexibility, tensile strength and toughness for 75 days' aging under room conditions and exposure to daylight. Similar film from the unmodified rubber hydrochloride solution became quite brittle after 30 days under the same conditions.

*Example IV*

To a 5% solution in chloroform of rubber hydrochloride was added 7% (based on the weight of the rubber hydrochloride) of di-butyl-amine (ammonium) laurate, which dissolved readily in the solution. Transparent, self-supporting films approximately 0.001 inch thick were prepared from the above composition by solvent evaporation. These films retained in large measure their flexibility, tensile strength and toughness for 62 hours under room conditions when exposed to a sun lamp. Similar films of unmodified rubber hydrochloride became quite brittle after 40 hours exposure under the same conditions.

*Example V*

The process of Example II was repeated with another batch of rubber hydrochloride. The results of aging were as follows:

| Stabilizer | Sun-lamp | Fadeometer (U. V. light) | Day-light | 65° C. dark |
|---|---|---|---|---|
| | Hours | Hours | Days | Days |
| Blank (no stabilizer) | 40 | 36 | 30 | 15 |
| Benzyl-tri-methyl-ammonium stearate | 52 | 64 | 85 | 47 |

The stabilizing effect of the ammonium hydroxide derivatives is clearly illustrated by these figures (for one such derivative) which give the time elapsing before embrittlement was observed.

In the preparation of the compositions of this invention, it is preferable to employ a neutral rubber hydrochloride from which free hydrogen chloride (if any) has been removed by any suitable method, for example, by washing the rubber hydrochloride with methanol, by treatment of the rubber hydrochloride (which may be in solution) with basic material such as alkali carbonates, hydroxides, oxides and the like, alkaline earth carbonates, hydroxides, oxides and the like, with organic amines and the like, followed by removal of the basic material (and its salt).

The amount of the stabilizer ordinarily used falls within the range 0.5% to 12%, based on the weight of the rubber hydrochloride. The intermediate range of 1% to 10%, and usually the still more specific range of 1% to 5%, has been found preferable. For special purposes more than 12% may be used.

In the preparation of transparent films from rubber hydrochloride compositions containing the stabilizer, it is preferred that the stabilizer be compatible with the rubber hydrochloride and be used in an amount which is compatible with the rubber hydrochloride. It is also preferred that it be soluble in solvents for rubber hydrochloride (chloroform, carbon tetrachloride, benzene, toluene, methylene chloride and the like). When transparency is not essential, it is not necessary that the stabilizer be completely compatible with the rubber hydrochloride or that it be used in an amount which is compatible with the rubber hydrochloride.

The preferred ammonium hydroxide substitution derivative stabilizers are methyl-propyl-ammonium oleate, benzyl-tri-methyl-ammonium stearate and di-butyl-ammonium laurate. The stearic acid salts of ammonium hydroxide derivatives are preferred as a sub-class.

The alkyl (used to include aralkyl) substitution derivatives of ammonium hydroxide of the present invention are comprehended by the general formula:

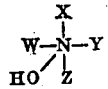

in which W, X, Y and Z are hydrogen or alkyl.

The aliphatic acids employed contain 12 to 20 carbon atoms. Acids containing more than 20 carbon atoms are useful for special purposes.

The salts in which one or more of the radicals W, X, Y and Z are aryl groups are (in general) not as effective as the corresponding alkyl compounds but they are far superior to the stabilizers known to the art. When there is an alphyl carbon atom between an aryl group and the nitrogen atom, the resulting (aralkyl) ammonium salts act like or behave comparably with the alkyl ammonium salts.

The stabilizers may be used singly or in combination.

The stabilizer may be introduced into the rubber hydrochloride composition in any suitable manner, for example, by the use of a neutral solvent, by milling, by grinding or kneading, and the like.

The rubber hydrochloride may be prepared by any of the various methods known to the art, for example, by the addition of gaseous hydrogen chloride to rubber dissolved in a chlorinated solvent, by the treatment of rubber with solutions of substantially anhydrous hydrogen chloride in a non-solvent for the rubber (ethyl acetate and the like), by the reaction of rubber with liquid substantially anhydrous hydrogen chloride at low temperatures (such as −80° C.), and the like.

Complete saturation with hydrogen chloride is not necessary to produce a useful and important material. The rubber hydrochloride employed preferably has a combined chlorine content of 28% to 32%, but comparable results are obtained with material whose chlorine content is within the range 26% to 34%.

Either amorphous or crystalline varieties, or mixtures of these varieties, may be employed. Mixtures of rubber hydrochlorides of different chlorine contents may be employed, for example, various production batches may be blended.

One very desirable method for preparing the rubber hydrochloride is to saturate (at room temperature) a 3% solution (in chloroform) of 30 minute milled pale crepe rubber with dry hydrogen chloride, and to thereafter pass additional hydrogen chloride into the solution for 48 hours (with stirring). The resulting solution is then poured slowly into a large excess of methanol, whereby the rubber hydrochloride is precipitated. The product is then washed with methanol until the washings are neutral to bromthymol. For convenience in handling, the rubber hydrochloride may then be redissolved in chloroform to produce a 5% solution. The chlorine content of this rubber hydrochloride should be 30.5% to 31.5%.

The new compositions may also contain, in addition to the stabilizing material which curbs or restrains the deterioration, modifying agents such as natural resins, synthetic resins, waxes, wax substitutes, wax-like materials, wax blending agents, oils, drying oils, driers, fats, anti-static agents, slip agents, pigments, metallic powders, fillers, dyes, plasticizers, etc. Minor proportions of other film forming materials and stabilizers, singly or in combination, may be employed.

Compositions of glass-clear transparency can readily be prepared according to this invention, because of the excellent solubility and compatibility of the stabilizers. The stabilizers cause no substantial change in the film-forming properties of the rubber hydrochloride, and may, for this reason, be used in larger amounts (if this is desirable considering the specific purpose to which the composition is to be put) than stabilizers heretofore proposed in the art. An additional advantage for compositions of this invention resides in the fact that the stabilizers do not evaporate from the compositions. As a result, the compositions retain their resistance to light and heat over long periods of time, a characteristic heretofore unknown because the only organic stabilizers were considered suitable for rubber hydrohalides were volatile.

Rubber hydrochloride compositions containing long chain aliphatic acid salts of alkyl substitution derivatives of ammonium hydroxide may be dissolved in solvents in any manner known to the art, and may be used in the preparation of transparent sheeting for wrapping purposes, protective coatings and the like. The compositions may be milled for the purpose of reducing the viscosity of the composition in order to obtain a high solids coating composition. In addition, these rubber hydrochloride compositions may be rolled and calendered into sheets or molded under heat and pressure into articles of commerce. The compositions may be used for lamination by heat and pressure or with adhesives, and for the coating of paper, sheets of regenerated cellulose, transparent sheets and films of all kinds, synthetic or natural filaments and fibers, textiles, wood, metal, stone, ceramic materials, glass, and the like, and may be used as adhesives.

A multitude of other uses for rubber hydrochloride are well known to the art, and need not be repeated here. The compositions of the present invention are especially suited for the preparation of thin (that is, on the order of a few ten-thousandths to a few hundredths of an inch in thickness) sheet material, particularly transparent, self-supporting films which are highly durable, tear resistant, and water resistant. Films of such compositions resist or repress the action of heat and the action of light.

As many apparently widely different embodiments of this invention may be made without departing from the spirit and scope thereof, it is to be understood that this invention is not limited to the specific embodiments thereof except as defined in the appended claims.

I claim:

1. A composition of matter which includes a rubber hydrohalide stabilized with 5% of its weight of benzyl trimethyl ammonium stearate.

2. A composition of matter which includes a rubber hydrohalide stabilized with at least 0.5% (based on the rubber hydrochloride) of an aliphatic acid salt of benzyl trimethyl ammonium hydroxide, said aliphatic acid having 12 to 20 carbon atoms.

3. The method of preserving rubber hydrochloride which comprises treating rubber hydrochloride with at least 0.5% (based on the rubber hydrochloride) of an aliphatic acid of salt of benzyl trimethyl ammonium hydrochloride, said aliphatic acid having more than 12 carbon atoms.

4. A sheet wrapping material comprising essentially rubber hydrohalide stabilized with 5% of its weight of the benzyl trimethyl ammonium salt of an aliphatic acid having 12 to 20 carbon atoms.

5. A sheet wrapping material comprising essentially rubber hydrohalide stabilized with 5% of its weight of the benzyl trimethyl ammonium salt of an aliphatic acid having more than 12 carbon atoms.

6. A composition of matter which includes a rubber hydrochloride stabilized with 5% of its weight of benzyl trimethyl ammonium stearate.

7. A composition comprising essentially rubber hydrochloride of 26% to 34% chlorine content together with at least 0.5% (based on the rubber hydrochloride) of an aliphatic acid salt of benzyl trimethyl ammonium hydroxide, said aliphatic acid having 12 to 20 carbon atoms.

8. A composition comprising essentially rubber hydrochloride of 26% to 34% chlorine content together with at least 0.5% (based on the rubber hydrochloride) of an aliphatic acid salt of benzyl trimethyl ammonium hydroxide, said aliphatic acid having more than 12 carbon atoms.

9. A sheet wrapping material comprising essentially rubber hydrochloride of 26% to 34% chlorine content together with at least 0.5% (based on the rubber hydrochloride) of benzyl trimethyl ammonium stearate.

10. A composition comprising essentially rubber hydrochloride of 26% to 34% chlorine content together with at least 0.5% (based on the rubber hydrochloride) of benzyl trimethyl ammonium stearate.

11. Sheet wrapping material comprising essentially rubber hydrochloride stabilized with about 5% of its weight of benzyl trimethyl ammonium salt of aliphatic acid having more than 12 carbon atoms.

12. Sheet wrapping material comprising essentially rubber hydrochloride stabilized with about 5% of its weight of benzyl trimethyl ammonium salt of aliphatic acid having 12 to 20 carbonations.

13. A composition comprising essentially rubber hydrohalide, together with at least 0.5% (based on the rubber hydrohalide) of an aliphatic acid salt of benzyl trimethyl ammonium hydroxide, said aliphatic acid having more than 12 carbon atoms.

14. A composition of matter comprising essentially rubber hydrohalide, together with at least 0.5% (based on the rubber hydrohalide) of benzyl trimethyl ammonium stearate.

ALBERT HERSHBERGER.